US007697481B2

(12) United States Patent
Rayzman et al.

(10) Patent No.: US 7,697,481 B2
(45) Date of Patent: Apr. 13, 2010

(54) DEVICE, SYSTEM AND METHOD OF LAYER 2 HANDOVER BETWEEN HEREOGENOUS NETWORKS

(75) Inventors: Giora Rayzman, Rishon LeZion (IL); Oren Kaidar, Binyamina (IL); Miriam Ratner, Ramat-Gan (IL)

(73) Assignee: Intel Corporation, Santa Clara, CA (US)

( * ) Notice: Subject to any disclaimer, the term of this patent is extended or adjusted under 35 U.S.C. 154(b) by 839 days.

(21) Appl. No.: 11/394,180

(22) Filed: Mar. 31, 2006

(65) Prior Publication Data

US 2007/0230401 A1 Oct. 4, 2007

(51) Int. Cl.
*H04W 4/00* (2006.01)

(52) U.S. Cl. .................. 370/331; 370/328; 370/329; 370/330; 370/332; 370/333; 455/436; 455/439; 455/442

(58) Field of Classification Search .......... 370/328, 370/329, 330, 331, 332, 333; 455/436, 439, 455/442
See application file for complete search history.

(56) References Cited

U.S. PATENT DOCUMENTS

| | | | |
|---|---|---|---|
| 5,533,018 A | 7/1996 | DeJager et al. | |
| 5,923,702 A | 7/1999 | Brenner et al. | |
| 5,999,823 A | 12/1999 | Yoneyama et al. | |
| 6,370,114 B1 | 4/2002 | Gullicksen et al. | |
| 6,600,931 B2 | 7/2003 | Sutton et al. | |
| 6,609,003 B1 * | 8/2003 | Park et al. | 455/436 |
| 2002/0067707 A1 * | 6/2002 | Morales et al. | 370/331 |
| 2002/0068566 A1 * | 6/2002 | Ohlsson et al. | 455/436 |
| 2002/0082019 A1 * | 6/2002 | Sunay et al. | 455/442 |
| 2002/0196753 A1 * | 12/2002 | Famolari | 370/335 |
| 2003/0045272 A1 | 3/2003 | Burr | |
| 2003/0078062 A1 | 4/2003 | Burr | |
| 2003/0079003 A1 | 4/2003 | Burr | |
| 2003/0119509 A1 | 6/2003 | Yun | |
| 2003/0147370 A1 * | 8/2003 | Wu | 370/338 |
| 2003/0193911 A1 | 10/2003 | Zhao et al. | |
| 2004/0229649 A1 * | 11/2004 | Nishimura et al. | 455/560 |

(Continued)

OTHER PUBLICATIONS

International Search Report of Application No. PCT/US2007/008429, dated Sep. 19, 2007.

(Continued)

*Primary Examiner*—Rafael Pérez-Gutiérrez
*Assistant Examiner*—Liton Miah
(74) *Attorney, Agent, or Firm*—Shiloh et al.

(57) ABSTRACT

Embodiments of the present invention provide devices, systems and methods of seamless layer 2 handover between heterogeneous networks for a hybrid wireless communication device. For example, an apparatus includes a first wireless transceiver able to operate in accordance with a first wireless communication protocol, a second, collocated, wireless transceiver able to operate in accordance with a second wireless communication protocol, and possibly shared radio frequency components. A method includes a fragmented handover procedure in which a network entry procedure is divided into atomic operations which may be performed during short, orderly, absences from the active network. The method further includes orderly switching back to the active network for any data or connection-management transactions, until the fragmented handover is completed and layer 2 connections are established at the second network. Other features are described and claimed.

17 Claims, 5 Drawing Sheets

U.S. PATENT DOCUMENTS

| | | |
|---|---|---|
| 2005/0135318 A1 | 6/2005 | Walton et al. |
| 2005/0215197 A1 | 9/2005 | Chen et al. |
| 2005/0282548 A1* | 12/2005 | Kim et al. .................. 455/436 |
| 2006/0094431 A1* | 5/2006 | Saifullah et al. ............ 455/436 |
| 2006/0227801 A1 | 10/2006 | Nanda et al. |
| 2007/0014269 A1 | 1/2007 | Sherman et al. |
| 2007/0183383 A1 | 8/2007 | Bitran et al. |
| 2007/0238482 A1 | 10/2007 | Rayzman |

OTHER PUBLICATIONS

IEEE P802.21/D00.05, Draft IEEE Standard for Local and Metropolitan Area Networks: Media Independent Handover Services, Lan Man Standards Committee of the IEEE Computer Society, by The Institute of Electrical and Electronics Engineers, Inc. (Jan. 2006).

International Search Report and Written Opinion for PCT/US2007/064491, mailed on Sep. 5, 2007.

Office Action for U.S. Appl. No. 11/392,958, mailed on Mar. 4, 2009.

* cited by examiner

DEVICE, SYSTEM AND METHOD OF LAYER 2 HANDOVER BETWEEN HEREOGENOUS NETWORKS

BACKGROUND OF THE INVENTION

In the field of wireless communications, a hybrid wireless communication station may include multiple wireless transceivers, for example, a first wireless transceiver able to operate in accordance with a first wireless communication standard or protocol, and a second transceiver able to operate in accordance with a second wireless communication standard or protocol. In some cases, the hybrid station may include separate subsystems for wireless communication with heterogeneous networks, and may share radio frequency (RF) components.

In many cases, the hybrid station may be fully connected to only one network at a time, for example, due to consideration such as operating cost, power consumption, or interference that may be caused by concurrent communication of wireless signals by the first and second transceivers. Thus, the hybrid station may be connected to a primary network with one active subsystem that is fully associated, while the other subsystem is not fully connected to the network, e.g. it is unassociated, scanning or in idle mode in the other, secondary, network. As network conditions change, e.g., during roaming from one coverage area to another, handover to the other network may be required.

However, the handover duration between the heterogeneous networks may be quite long. In order to avoid (relatively) long intervals without layer 2 (L2) network connectivity during handover, a special mechanism may be required to enable L2 transactions at the active network while entering the secondary network.

Current solutions for collocated heterogeneous network technologies may not provide means of accurate coordination between the two subsystems. For example, they may not include support for an effective layer 2 make-before-break handover between the heterogeneous subsystems, and thus the requirements of low latency applications for seamless handover are not being met. In particular, current solutions do not promote the use of shared RF for multi-radio implementations that require seamless roaming.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless access point (AP), a modem, a wireless modem, a personal computer, a desktop computer, a mobile computer, a laptop computer, a notebook computer, a tablet computer, a handheld computer, a server computer, a personal digital assistant (PDA) device, a handheld PDA device, a network, a wireless network, a local area network (LAN), a wireless LAN (WLAN), a metropolitan area network (MAN), a wireless MAN (WMAN), wide area network (WAN), wireless WAN (WWAN), devices and/or networks operating in accordance with existing Institute of Electrical and Electronics Engineers (IEEE) standards such as IEEE 802.11, 802.11a, 802.11b, 802.11e, 802.11g, 802.11h, 802.11i, 802.11n, 802.16, 802.16e, 802.16d and other derivatives, long-term evolution (LTE) standards and/or future versions of the above standards, a personal area network (PAN), a wireless PAN (WPAN), units and/or devices which are part of the above WLAN and/or PAN and/or WPAN networks, one way and/or two-way radio communication systems, cellular radio-telephone communication systems, a cellular telephone, a cellular smartphone, a wireless telephone, a personal communication systems (PCS) device, a PDA device which incorporates a wireless communication device, a multiple input multiple output (MIMO) transceiver or device, a single input multiple output (SIMO) transceiver or device, a multiple input single output (MISO) transceiver or device, a multi receiver chain (MRC) transceiver or device, a transceiver or device having "smart antenna" technology or multiple antenna technology, or the like. Some embodiments of the invention may be used in conjunction with one or more types of wireless communication signals and/or systems, for example, radio frequency (RF), infra red (IR), frequency-division multiplexing (FDM), orthogonal FDM (OFDM), OFDMA, s-OFDMA, time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, multi-carrier modulation (MDM), discrete multi-tone (DMT), Bluetooth®, ZigBee™, or the like. Embodiments of the invention may be used in various other apparatuses, devices, systems and/or networks.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

It should be appreciated that according to some embodiments of the present invention, the method described below, may be implemented in machine-executable instructions. These instructions may be used to cause a general-purpose or special-purpose processor that is programmed with the instructions to perform the operations described. Alternatively, the operations may be performed by specific hardware that may contain hardwired logic for performing the operations, e.g. an application-specific integrated circuit (ASIC) or a field-programmable gate array (FPGA), or by any combination of programmed computer components and custom hardware components. Various general-purpose systems may be used with programs in accordance with the teachings herein, or it may prove convenient to construct a more specialized apparatus to perform the desired method. The desired structure for a variety of these systems will appear from the description below.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Although embodiments of the invention are not limited in this regard, the term "reduced power mode" as used herein may include, for example, an idle mode, a standby mode, a power conservation mode, a power save mode, an efficiency mode, a "sleep" mode, a semi-operational mode, a semi-active mode, a partially-active mode, or other modes of operations in which a component (e.g., a transceiver or a sub-unit thereof) is not fully operational and/or active.

Although portions of the discussion herein may relate, for demonstrative purposes, to a hybrid wireless communication device having a first transceiver able to operate in accordance with IEEE 802.11 standard and its derivatives, and a second transceiver able to operate in accordance with IEEE 802.16 standard and its derivatives, embodiments of the invention are not limited in this regard, and may be used in accordance with various other types of transceivers and combination thereof, including, for example, ZigBee transceivers, cellular communication transceivers, or the like.

Although embodiments of the invention are not limited in this regard, the term "layer 2" or "L2" as used herein may refer to the second layer of the seven-layer OSI model of network communications, also known as the data link layer. As known in the art, L2 connectivity may provide functional and procedural means to transfer data between network entities, and might optionally provide the means to detect and possibly correct errors that may occur in the physical layer (layer 1). For example, the data link layer may include a logical link control (LLC) sublayer to multiplex protocols running atop the data link layer, and optionally to provide flow control, acknowledgment, and error recovery, and a media access control (MAC) sublayer to determine which network entity or entities are allowed access to the medium at any one time.

Although embodiments of the invention are not limited in this regard, the term "handover" as used herein may refer to the process of transferring active connectivity of a wireless communication device from one wireless connection to another, without substantial interruption of the ongoing session. As known in the art, "handover" may also be referred to as "handoff".

Figure 1:
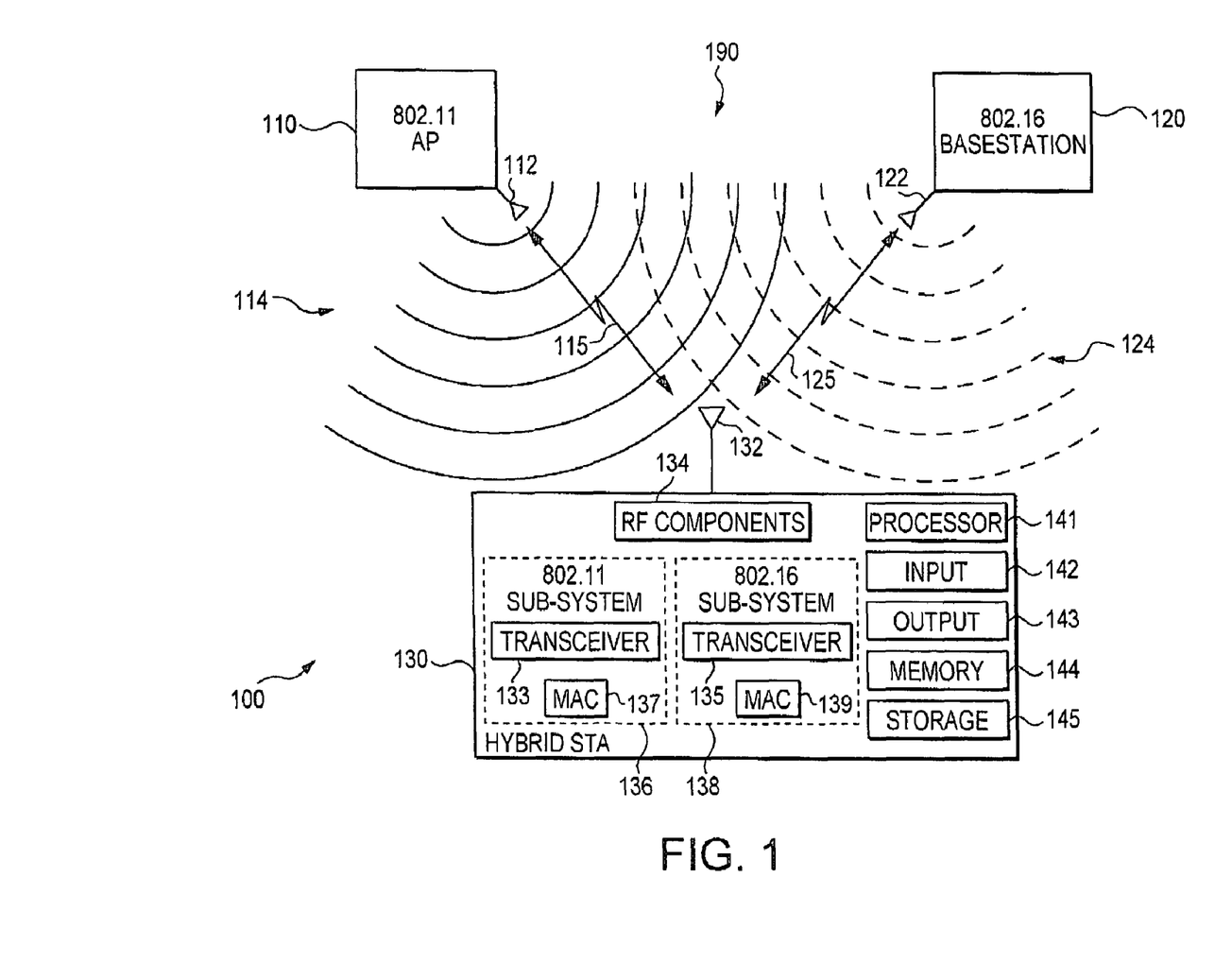
FIG. 1 is a schematic block diagram illustration of a wireless communication system utilizing layer 2 network handover in accordance with an embodiment of the invention.

Reference is made to FIG. 1, which schematically illustrates a block diagram of a wireless communication system 100 utilizing layer 2 network handover between heterogeneous networks in accordance with an embodiment of the invention. System 100 may include one or more wireless communication stations, for example, a station 130. System 100 may optionally include other wireless devices, for example, an access point (AP) 110, e.g., able to operate in accordance with IEEE 802.11 standard; and a base station 120, e.g., able to operate in accordance with IEEE 802.16 standard.

In some embodiments, for example, station 130 may be a hybrid wireless communication device, e.g., a station including multiple wireless transceivers able to operate in accordance with multiple, respective, medium access schemes, e.g., synchronic and/or asynchronous standards or protocols, scheduled and/or non-scheduled standards or protocols, managed and/or non-managed standards or protocols, burstable and/or non-burstable standards and/or protocols, or the like. For example, in one embodiment, station 130 may include a first subsystem 136 to enable operation in accordance with a first medium access scheme, e.g., IEEE 802.11 standard, and a second subsystem 138 to enable operation in accordance with a second medium access scheme, e.g., IEEE 802.16 standard. Other suitable wireless communication standards or protocols may be used.

Although embodiments of the invention are not limited in this respect, subsystem 136 may include, for example, a wireless transceiver 133, a media access controller (MAC) 137, and any other software and/or hardware elements suitable for operation in accordance with IEEE 802.11 standard as known in the art. Subsystem 138 may include, for example, a wireless transceiver 135, a media access controller (MAC) 139, and any other software and/or hardware elements suitable for operation in accordance with IEEE 802.16 standard as known in the art.

Although embodiments of the invention are not limited in this respect, transceiver 133 and/or transceiver 135 may include, for example, a wireless radio frequency (RF) transceiver able to transmit and/or receive wireless RF signals, e.g., through one or more antennas 132. In some embodiments, for example, transceiver 133 and/or transceiver 135 may be implemented using a transmitter, a receiver, a transmitter-receiver, or one or more units able to perform separate or integrated functions of transmitting and/or receiving wireless communication signals, blocks, frames, transmission streams, packets, messages and/or data.

In one embodiment, for example, transceivers 133 and 135 may be implemented using a single component, e.g., a dual-transceiver card or modem, a multiple-transceiver card or modem, or the like. Additionally or alternatively, for example, transceivers 133 and 135 may optionally be otherwise collocated within a single modem, card, packaging, housing, wireless communication unit, wireless communication component, or the like. In some embodiments, hybrid station 130 may include a single hybrid wireless transceiver, for example, able to alternately operate in accordance with two or more different wireless communication standards or protocols, e.g., the transceiver may switch between operation in IEEE 802.11 and operation in IEEE 802.16. Hybrid station 130 may include radio frequency (RF) components 134, which may be shared by the first and second subsystems, e.g., by wireless transceivers 133 and 135. In other embodiments, the separate subsystems may include separate, respective, RF components.

It will be appreciated that, although FIG. 1 shows, for demonstrative purposes and for clarity of description, transceivers 133, 135 and MACs 137, 139 as separate components or modules, embodiments of the invention are not limited in this regard. For example, in some embodiments, some components of station 130 may be implemented using "physical" units, whereas other components of station 130 may be implemented using "logical" units or modules. In one embodiment, for example, transceiver 133 may include all or part of MAC 137 (e.g. an upper or lower MAC, as known in the art), and may optionally include one or more parts of the shared or separate RF components 134; similarly, for example, transceiver 135 may include all or part of MAC 139 (e.g. an upper or lower MAC, as known in the art), and may optionally include one or more parts of the shared or separate RF components 134. Other implementations of separate, integrated and/or combined units, physical units and/or logical modules may be used.

Station 130 may communicate with AP 110 and with base station 120 using a shared access medium 190, for example, through wireless communication links 115 and 125, respectively. Link 115 may include a stream of wireless signals or packets of traffic that are communicated between station 130 and AP 110 in accordance with a first medium access scheme; link 125 may include a stream of wireless signals or packets of traffic that are communicated between station 130 and base station 120 in accordance with a second medium access scheme. Although embodiments of the invention are not limited in this respect, station 130, AP 110, and base station 120 may be operatively associated with antennas 132, 112, and 122, respectively. Antennas 112, 122, and 132 may include one or more internal and/or external RF antennae, for example, a dipole antenna, a monopole antenna, an omni-directional antenna, an end fed antenna, a circularly polarized antenna, a micro-strip antenna, a diversity antenna, or any other type of antennae suitable for transmitting and/or receiving wireless communication signals, blocks, frames, transmission streams, packets, messages and/or data.

In some embodiments, system 100 may be or may include one or more wireless communication networks, for example, an a-synchronic or asynchronous wireless network, a synchronic wireless network, a managed wireless network, a non-managed wireless network, a burstable wireless network, a non-burstable wireless network, a scheduled wireless network, a non-scheduled wireless network, or the like. For example, in one embodiment, AP 110 and subsystem 136 of station 130 may be able to operate in accordance with a first wireless communication standard, e.g., a protocol relating to the IEEE 802.11 standard or derivatives thereof, which may be a-synchronic, asynchronous, non-managed, non-scheduled, or the like; whereas base station 120 and subsystem 138 of station 130 may be able to operate in accordance with a second wireless communication standard, e.g., a protocol relating to the IEEE 802.16 standard or derivatives thereof, which may be synchronic, managed, scheduled, or the like.

AP 110 may provide a first coverage area 114 of a first wireless communication network, e.g., a network in accordance with IEEE 802.11. Base station 120 may provide a second coverage area 124 of a second wireless communication network, e.g., a network in accordance with IEEE 802.16. Thus, station 130 may be able to associate with AP 110 and the first network when in coverage area 114, and to associate with base station 120 and the second network when in coverage area 124. Although embodiments of the invention are not limited in this respect, coverage areas 114 and 124 may at least partially overlap, and station 130 may be located within the overlapping coverage area. For example, coverage area 114 may be entirely included within coverage area 124. In some embodiments, while in the overlapping coverage area, station 130 may utilize a channel access scheme having an orderly absence mechanism, e.g., an orderly time-division multiple access (TDMA) scheme, such that station 130 may be absent from a first wireless network (e.g., IEEE 802.11 network) while station 130 operates in a second wireless network (e.g., IEEE 802.16 network), or vice versa.

For example, at a first time slot, subsystem 136 of station 130 may operate (e.g., in accordance with IEEE 802.11 standard) and communicate with AP 110 via link 115, whereas subsystem 138 of station 130 may not operate and may not communicate with base station 120. Similarly, at a second time slot, subsystem 138 of station 130 may operate (e.g., in accordance with IEEE 802.16 standard) and communicate with base station 120 via link 125, whereas subsystem 136 of station 130 may not operate and may not communicate with AP 110. A method of seamless (e.g. "make-before-break") handover of layer 2 transactions between the heterogeneous networks is described in detail below with reference to the remaining figures.

In some embodiments, subsystems 136 and 138 may be synchronized or co-synchronized, e.g., may share a common timing mechanism, or have a timing synchronization mechanism. For example, in one embodiment, subsystems 136 and 138 may be operatively connected to a clock of station 130, which may provide a common timing mechanism for the subsystems. In another embodiment, for example, software-based and/or hardware-based synchronization mechanisms may be used to synchronize between subsystems 136 and 138, between transceivers 133 and 135, and/or between MACs 137 and 139. For example, such synchronization may be part of an orderly time division multiple access scheme that may be used by the hybrid station, e.g., to alternately communicate with the first and second networks.

For example, station 130 may optionally include a coordinator to coordinate between the operations of subsystems 136 and 138. The coordinator may be implemented, for example, as part of transceivers 133 and 135, as a combination of transceivers 133 and 135, as part of MACs 137 and 139 (e.g., as part of an upper and/or lower MAC of MACs 137 and 139), as a separate sub-unit of station 130, using software components and/or hardware components, or the like. In some embodiments, components of the coordinator may correspond to various components of subsystems 136 and 138 or station 130, such that, for example, components of the coordinator may correspond to a high-level architecture of transceivers 133 and 135 or other components of station 130.

Station 130 may include, for example, a processor 141, an input unit 142, an output unit 143, a memory unit 144, and a storage unit 145. Station 130 may further include RF components 134 and multiple wireless communication subsystems, for example, subsystems 136 and 138 including respective transceivers 133 and 135 and respective MACs 137 and 139, as well as one or more antennas, for example, antenna 132. Station 130 may optionally include other suitable hardware components and/or software components. In some embodiments, the components of station 130 may be enclosed in, for example, a common housing, packaging, or the like.

Processor 141 may include, for example, a central processing unit (CPU), a digital signal processor (DSP), a microprocessor, a controller, a chip, a microchip, one or more circuits, an integrated circuit (IC), e.g., an application-specific integrated circuit (ASIC), a field-programmable gate array (FPGA), or any other suitable multi-purpose or specific processor or controller. Processor 141 may, for example, process signals and/or data transmitted and/or received by station 130. In some embodiments, processor 141 may include or may be the coordinator as described herein, and may be able to coordinate handover of an active wireless connection, e.g., link 115 or 125, from a first network to a second network such that layer 2 connectivity is maintained. For example, processor 141 may be able to perform fragmented sequence of one or more atomic operations in the second network, interleaved with periods of activity in the first network, as described in detail below with reference to FIGS. 2-5.

Input unit 142 may include, for example, a keyboard, a keypad, a mouse, a touch-pad, a stylus, a microphone, or other suitable pointing device or input device. Output unit 143 may include, for example, a cathode ray tube (CRT) monitor or display unit, a liquid crystal display (LCD) monitor or display unit, a screen, a monitor, a speaker, a set of light emitting diodes (LEDs), or other suitable display unit or output device.

Memory unit 144 may include, for example, a random access memory (RAM), a read only memory (ROM), a dynamic RAM (DRAM), a synchronous DRAM (SD-RAM), a flash memory, a volatile memory, a non-volatile memory, a cache memory, a buffer, a short-term memory unit, a long-term memory unit, or other suitable memory units or storage units. Storage unit 145 may include, for example, a hard disk drive, a floppy disk drive, a compact disk (CD) drive, a CD-ROM drive, or other suitable removable or non-removable storage units. Memory unit 144 and/or storage unit 145 may, for example, store data transmitted and/or received by station 130.

It will be appreciated by those skilled in the art that the simplified components schematically illustrated in FIG. 1 are intended for demonstration purposes only, and that other components may be required for operation of the wireless devices. Those of skill in the art will further note that the connection between components in a wireless device need not necessarily be exactly as depicted in the schematic diagram.

Figure 2:
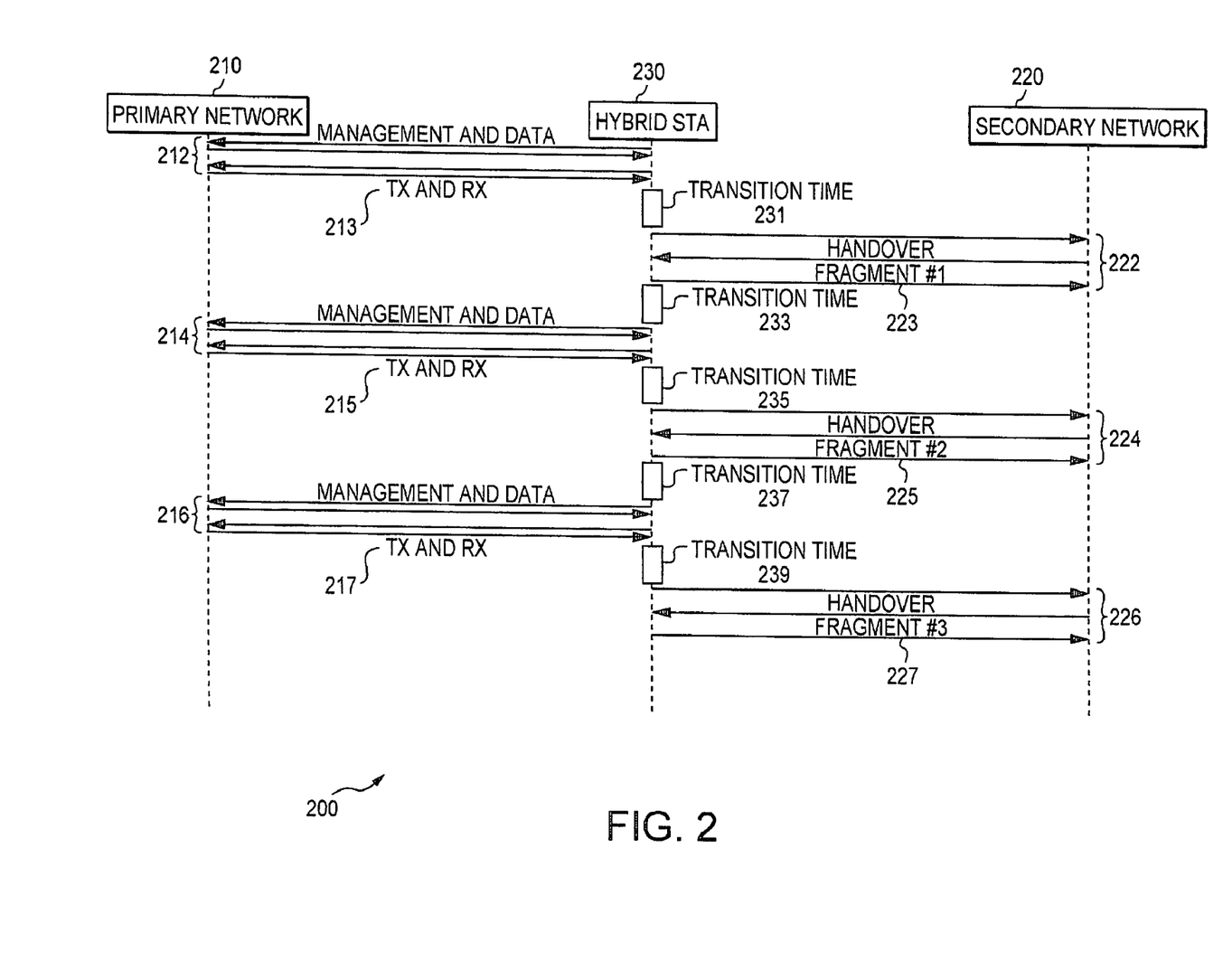
FIG. 2 is a schematic timing diagram of wireless communication signals during network handover in accordance with some demonstrative embodiments of the invention.

Reference is made to FIG. 2, which schematically illustrates a timing diagram 200 of wireless communication signals during layer 2 network handover in accordance with some demonstrative embodiments of the invention. Vertical axis 230 may indicate, for example, timing of wireless communication signals transmitted or received by a hybrid station such as station 130 of FIG. 1. Although embodiments of the invention are not limited in this respect, vertical axis 210 may indicate, for example, timing of signals communicated between subsystem 136 of hybrid station 130 and AP 110, e.g., in accordance with IEEE 802.11. Vertical axis 220 may indicate, for example, timing of signals communicated between subsystem 138 of hybrid station 130 and base station 120, e.g., in accordance with IEEE 802.16. It will be appreciated that the vertical axes 210, 220, 230 may not be drawn to scale and may not take into account such factors as, for example, the propagation delay time over the wireless media.

In accordance with some demonstrative embodiments of the invention, layer 2 transactions of a network entry or re-entry procedure may be divided into a sequence of layer 2 transactions comprising one or more atomic operations, and/or groups of atomic operations. It will be appreciated that a network entry procedure, as used herein, may refer to an entry procedure, a re-entry procedure, an association procedure, a re-association procedure, a return-from-idle procedure, or the like. Similarly, a network disassociation procedure, as used herein, may refer to a disassociation procedure, a deregistration procedure, or the like. Although embodiments of the invention are not limited in this regard, the term "atomic operation" or "atomic transaction", as used herein, may refer to an operation of the wireless communication protocol defined in the secondary network, e.g., transmitting and/or receiving a request or response as part of a conversation with the AP or BS, that may be completed without substantial interference to the layer 2 connectivity in the active network. Exit points of the sequence may be chosen accordingly.

In some embodiments, the atomic transactions may be chosen such that they may be repeated in the secondary network, e.g., re-sent in case of a failure, and are of a sufficiently short length to allow the hybrid station to switch back to the active network for such time periods as the applicable AP or BS expects the station to be present in the active channel. For example, a continuous WiMAX network re-entry procedure that requires approximately 130 ms to complete may be fragmented into a sequence of atomic transactions, each of which may typically require, for example, less than 50 ms to complete. It will be appreciated that these numbers are illustrative only, and that embodiments of the invention are not limited in this regard. For example, the lengths of the atomic operations may vary according to such factors as changes in the wireless communication standards, selection of exit points in the sequence, success or failure of previous operations in the sequence, requirements or parameters of one or more applications executed by the station (e.g., a vocoder cycle used for VoIP conversations by a VoIP application), wireless medium conditions, and the like. One example of atomic layer 2 transactions for entry to a network in accordance with IEEE 802.16 is described below with reference to FIG. 4; another example of atomic layer 2 transactions for entry to a network in accordance with IEEE 802.11 is described below with reference to FIG. 5.

Thus, a hybrid station, such as station 130 of FIG. 1, may utilize a fragmented network handover procedure in accordance with embodiments of the invention to perform a sequence of atomic transactions defined in a secondary network, e.g., for network entry or re-entry (e.g., association, re-association, or return-from-idle), during a corresponding sequence of short, orderly absences from a primary, active network. After each atomic transaction, e.g., at the sequence exit points, the hybrid station may activate the primary network to transmit and receive any control, management and/or data frames. It will be appreciated that a fragmented network handover mechanism may enable a seamless "make-before-break" implementation, as the station may continue to communicate traffic over the primary active network until level 2 association with the secondary network is complete. In some embodiments, the hybrid station may toggle between the two networks using existing orderly absence mechanisms or protocols, e.g., the power save or scan-while-work mechanisms of IEEE 802.11, or the periodic scan and/or sleep and/or idle mode of IEEE 802.16, as known in the art, or any other suitable mechanisms that may be utilized for orderly absence that may be added to future versions of the applicable standards for various applications.

Figure 3:
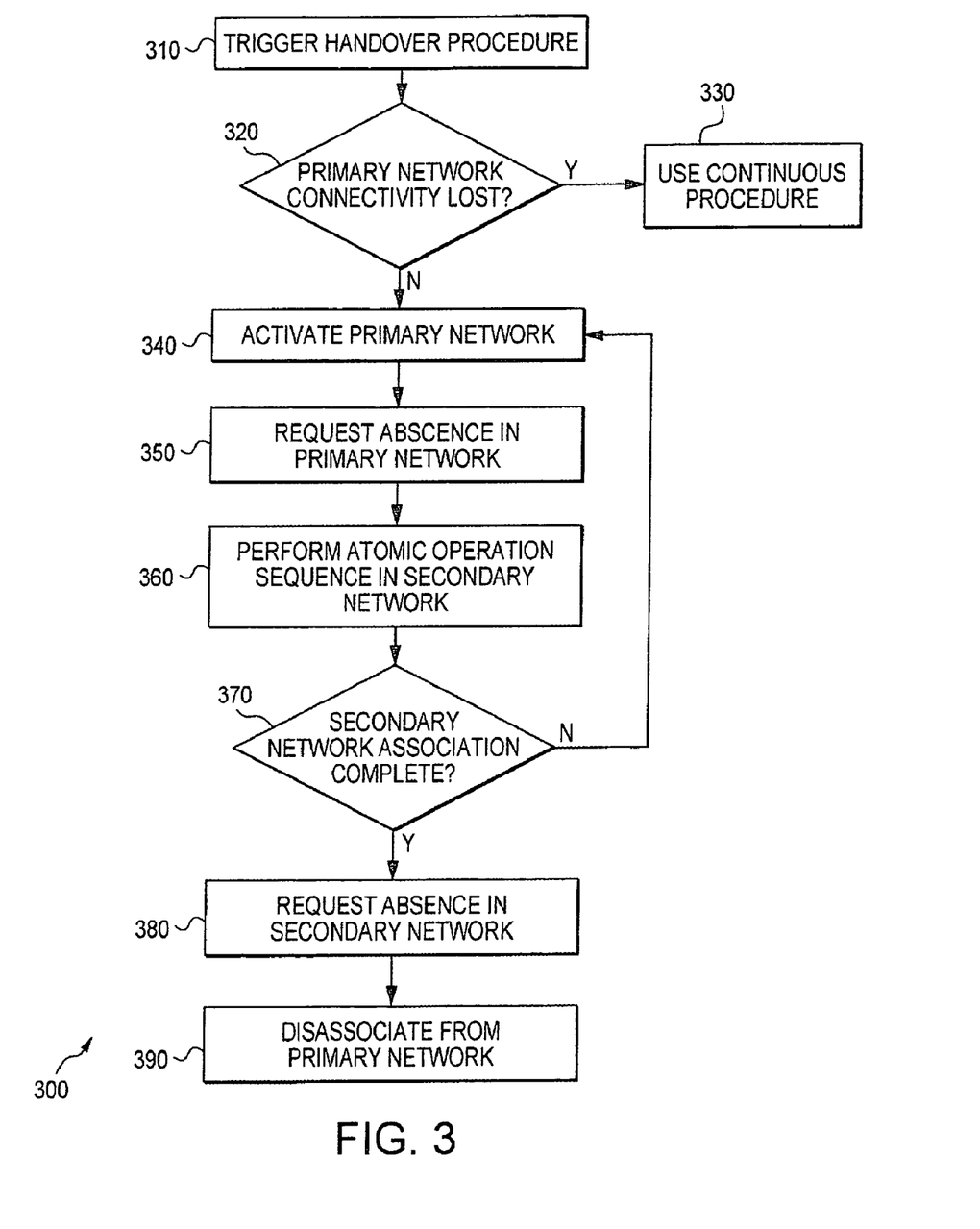
FIG. 3 is a schematic flowchart diagram of a method of layer 2 network handover in accordance with some demonstrative embodiments of the invention.

Reference is additionally made to FIG. 3, which schematically illustrates a flowchart diagram of a method 300 of layer 2 network handover in accordance with some demonstrative embodiments of the invention. Although embodiments of the invention are not limited in this respect, method 300 may be performed by one or more components of a hybrid station, e.g., by elements of subsystem 136 and/or subsystem 138 of station 130 in FIG. 1. However, other operations or sets of operations may be used in accordance with embodiments of the invention.

As indicated at block 310, method 300 may include triggering the network handover procedure. For example, in some embodiments handover may be triggered automatically in response to an upcoming "emergency" situation such as where connectivity with the active network, for example, a "Wi-Fi" network in accordance with IEEE 802.11, becomes relatively weak or unstable (e.g., due to changing conditions while moving towards the end of AP coverage area, interference from other RF devices, or RF signal obstruction caused by various RF blocking or absorbing objects) while connection to a secondary network, for example a "WiMAX" network in accordance with IEEE 802.16, is available to provide continued quality of service to applications. Additionally or alternatively, in some embodiments handover may be triggered manually by the user, for example, in a situation where connection to the secondary network may be less expensive than connection to the active network.

In some embodiments, when handover is triggered automatically, e.g., in response to failing connectivity, method 300 may not include waiting for expiration of any applicable listening intervals of the secondary network, e.g., an IEEE 802.16 paging interval as known in the art, and handover may begin immediately. As indicated at blocks 320 and 330, if connectivity with the primary network is lost, method 300 may use a continuous network entry procedure instead of the fragmented procedure described herein.

In some embodiments, fragmented handover method 300 may include activating the primary network and requesting an orderly absence, as indicated at block 340 and 350, respectively. For example, a hybrid station such as station 130 of FIG. 1 may request entry to a reduced power mode, e.g., a power save mode in accordance with IEEE 802.11 or IEEE 802.16. It will be appreciated that requesting a reduced power mode may result in buffering of pending frames for the station for the durations in which the station may be absent from the primary network and connecting to the secondary network. Thus, in accordance with embodiments of the invention, orderly allocation of time for association with the secondary network may be possible.

In accordance with demonstrative embodiments of the invention, method 300 may include performing a sequence of atomic operations of the secondary network entry procedure, interleaved with periods of activity in the primary network, until association with the secondary network is complete, for example, as indicated by an association response message from the secondary network. As indicated at blocks 340-370, while association with the secondary network is not complete, method 300 may include reactivating the primary network (340), requesting an orderly absence (350), and performing a next atomic transaction of the sequence in the secondary network (360). In some embodiments, if an atomic operation is not completed within the time period allocated for communication in the secondary network, method 300 may include performing a retry of the atomic operation in the next allocated period.

As indicated at blocks 380 and 390, when level 2 association with the secondary network is complete, method 300 may include requesting an orderly absence from the secondary network in order to complete disassociation or deregistration from the primary network. Although embodiments of the invention are not limited in this respect, the disassociation deregistration procedure may be also fragmented into a sequence of atomic transactions, after each of which the hybrid station may activate the secondary network. For example, in some embodiments the hybrid station may utilize an existing layer 2 absence mechanism, e.g., a power save mechanism, periodic scanning, or scan-while-work mechanism as known in the art, to ensure that frames such as management frames including connection parameters are not lost in the secondary network during disassociation or deregistration from the primary network.

In some embodiments, method 300 may allow loss of some management packets and/or frames in the primary network, e.g., IEEE 802.11 beacons that do not result in disconnection, for the duration of the layer 2 handover procedure. For example, the hybrid station may be executing one or more applications that may dictate an activation cycle for the active network, which may not match the cycle defined by the handover sequence in the secondary network. Thus non-critical packets or frames, e.g., IEEE 802.11 beacons which do not contain connection parameters, may be ignored at times when the hybrid station is communicating with the secondary network.

For example, referring again to FIG. 2, a first subsystem of the hybrid station, e.g., subsystem 136 (of FIG. 1) in accordance with IEEE 802.11 or subsystem 138 (of FIG. 1) in accordance with IEEE 802.16, may transmit and receive wireless communication signals of the primary network during time periods 212, 214, and 216; while a second subsystem of the hybrid station, e.g., subsystem 138 in accordance with IEEE 802.16 or subsystem 136 in accordance with IEEE 802.11, may transmit and receive wireless communication signals of the secondary network during time periods 222, 224, and 226. In some embodiments, for example, when the first and second subsystems share the same radio frequency components, transition time periods 231, 233, 235, 237, and 239 may be required to switch from the first subsystem to the second subsystem and vice versa.

In one embodiment, the transition time slots may have a constant length; for example, the length of transition time slot 231 may be substantially equal to the length of transition time slot 233. In another embodiment, transition time slots may have various lengths; for example, the length of transition time slots that follow a communication time slot of a first standard, may be different from the length of transition time slots that follow a communication time slot of a second standard. It will be appreciated that the transition time periods may be relatively short as compared to the time periods in which either the first or the second subsystem is active, e.g., 0.5 ms or 1.5 ms, compared to 30 ms, although embodiments of the invention are not limited in this regard.

In some embodiments, the fragmented network handover procedure may begin during time period 212, and the management frames 213 may include request for reduced power mode. Thus, AP 110 or base station 120 may buffer or delay transmission of frames to the hybrid station during time periods 231, 222, and 233 when the first subsystem may be absent from the primary network. Time periods 231 and 233 may be transition time periods during which neither the first subsystem of station 130 nor the second subsystem of station 130 may transmit or receive wireless signals. Time period 222 may be used to perform an atomic layer 2 transaction of the secondary network entry procedure, e.g., transmitting a first handover fragment 223. Although embodiments of the invention are not limited in this respect, the first subsystem may transmit and/or receive control, management and/or data frames 215 during time period 214. For example, in accordance with IEEE 802.11, the station may for example, transmit a doze state indication, or transmit a PS Poll control frame, as known in the art, and receive any buffered data frames from the AP. As another example, in accordance with IEEE 802.16, the station may receive data packets and may transmit a MOB_SLP-REQ request, as known in the art.

Figure 4:
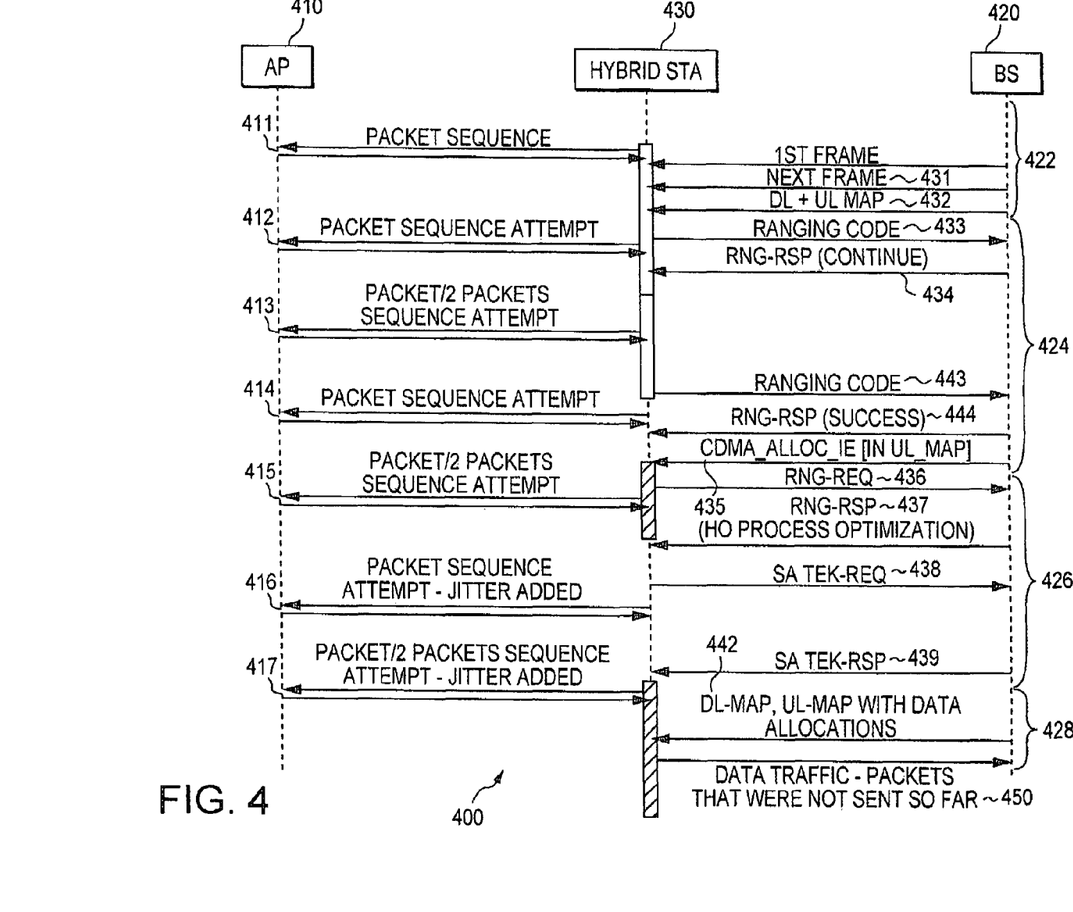
FIG. 4 is one example of a more detailed schematic timing diagram of wireless communication signals during network handover in accordance with one embodiment of the invention.

Reference is now made to FIG. 4, which schematically illustrates one example of a timing diagram 400 of wireless communication signals during network handover in accordance with one demonstrative embodiment of the invention. Although embodiments of the invention are not limited in this respect, timing diagram 400 may represent a fragmented layer 2 handover procedure from a first subsystem of a hybrid station, e.g., operating in accordance with IEEE 802.11 to a second subsystem of the hybrid station, e.g., operating in accordance with IEEE 802.16. It will be appreciated that the fragmented handover procedure may allow a "make-before-break" implementation where connectivity with a primary active network may be maintained during association or re-association with a heterogeneous secondary network.

Although embodiments of the invention are not limited in this respect, a vertical axis 430 may represent timing of signals transmitted or received by a hybrid station such as station 130 of FIG. 1 during the fragmented layer 2 network handover. A vertical axis 410 may represent timing of signals transmitted or received by an access point in the active network, e.g., AP 110 of FIG. 1 operating in accordance with IEEE 802.11. A vertical axis 420 may represent timing of signals transmitted or received by a base station in the secondary network, e.g., BS 120 of FIG. 1 operating in accordance with IEEE 802.16.

In some embodiments, as indicated on axis 420, the layer 2 network handover procedure to the secondary network may be logically divided into one or more stages, e.g., return-from-idle preparation 422, ranging 424, network re-entry 426, and normal operations 428. Although embodiments of the invention are not limited in this respect, stages 422-428 may each include one or more different atomic operations or groups of atomic operations.

For example, during return-from-idle preparation 422, the hybrid station may perform one or more layer 2 transactions to prepare components of the appropriate secondary network subsystem, e.g. subsystem 138 in accordance with IEEE 802.16, for meaningful reception of the wireless communication signals. An atomic transaction or group of atomic operations during this period may include, for example, receiving one or more frames from the base station (431) and/or receiving a downlink map and an uplink map (432), as known in the art, e.g., to provide necessary parameters to a baseband or a modem.

Although embodiments of the invention are not limited in this respect, the hybrid station may update one or more layer 1 parameters during ranging period 424, e.g. to update the physical layer of the appropriate subsystem for optimal communication with the base station. An atomic transaction or group of atomic operations during this period may include, for example, transmitting a ranging code (433), e.g., a CDMA ranging code as known in the art, and receiving a ranging response (434). In some embodiments, e.g., if an atomic operation is not successful, the atomic operations may be repeated at a subsequent activation of the secondary network. For example, the hybrid station may re-send the ranging code (443) and subsequently receive a successful ranging response 444.

In some embodiments, the hybrid station may update one or more layer 2 parameters during network re-entry period 426, e.g., security parameters, encryption keys, and the like. An atomic transaction or group of atomic operations during this period may include, for example, transmitting a SA_TEK request (438) and receiving a SA_TEK response (439), as are known in the art. In addition, the hybrid station may transmit an additional ranging request (436), e.g., RNG_REQ, as known in the art, and receive an additional ranging response (437), e.g., RNG-RSP, for optimization of L2 parameters, although embodiments of the invention are not limited in this regard.

In accordance with embodiments of the invention, as indicated on axis 430, the hybrid station may activate the primary network at time periods 411-417 to communicate with the active network AP. Although embodiments of the invention are not limited in this respect, during each of time periods 411-417, the hybrid station may attempt to transmit and/or receive one or more packets or data frames relating to a network application being executed, e.g., a packet of VoIP data. In addition, the hybrid station may request an orderly absence from the active network in order to perform a subsequent atomic operation in the secondary network. It will be appreciated that, as used herein, the term "orderly absence" may refer to any suitable mechanism or protocol as is known in the art that may allow the hybrid station and/or another station with which it communicates, e.g., AP 110 or base station 120, to determine in advance that the station (is expected to be absent from the wireless network, e.g., non-communicative, during a time slot; accordingly, substantially no transmission may be performed to or by the appropriate communication subsystem during the predetermined time slot.

In some demonstrative embodiments of the invention, the hybrid station may use the delay between transmitting a request to the base station in the secondary network and receiving the subsequent reply to activate the connection with the primary network. For example, after transmitting the ranging code at time 433 or 443, the hybrid station may communicate with an AP of the primary network during time periods 412 and 414, respectively, while waiting for the base station to respond with ranging responses 434 and 444. Similarly, the hybrid station may activate the primary network at time period 415 between ranging request 436 and ranging response 437; and at time period 416 between sending security parameter request 438 and receiving the TEK response 439. In other embodiments, the hybrid station may activate the connection with the primary network after a request-reply or other protocol message sequence in the secondary network.

As indicated by time period 428, the hybrid station may begin normal operations in the secondary network after the network re-entry period 426 is complete. Although embodiments of the invention are not limited in this respect, the station may receive, for example, data allocations 442, e.g., in a downlink map and an uplink map, as known in the art, and may transmit data traffic 450, e.g., one or more packets of data that may not have been sent in the primary network before completing the fragmented handover.

Figure 5:
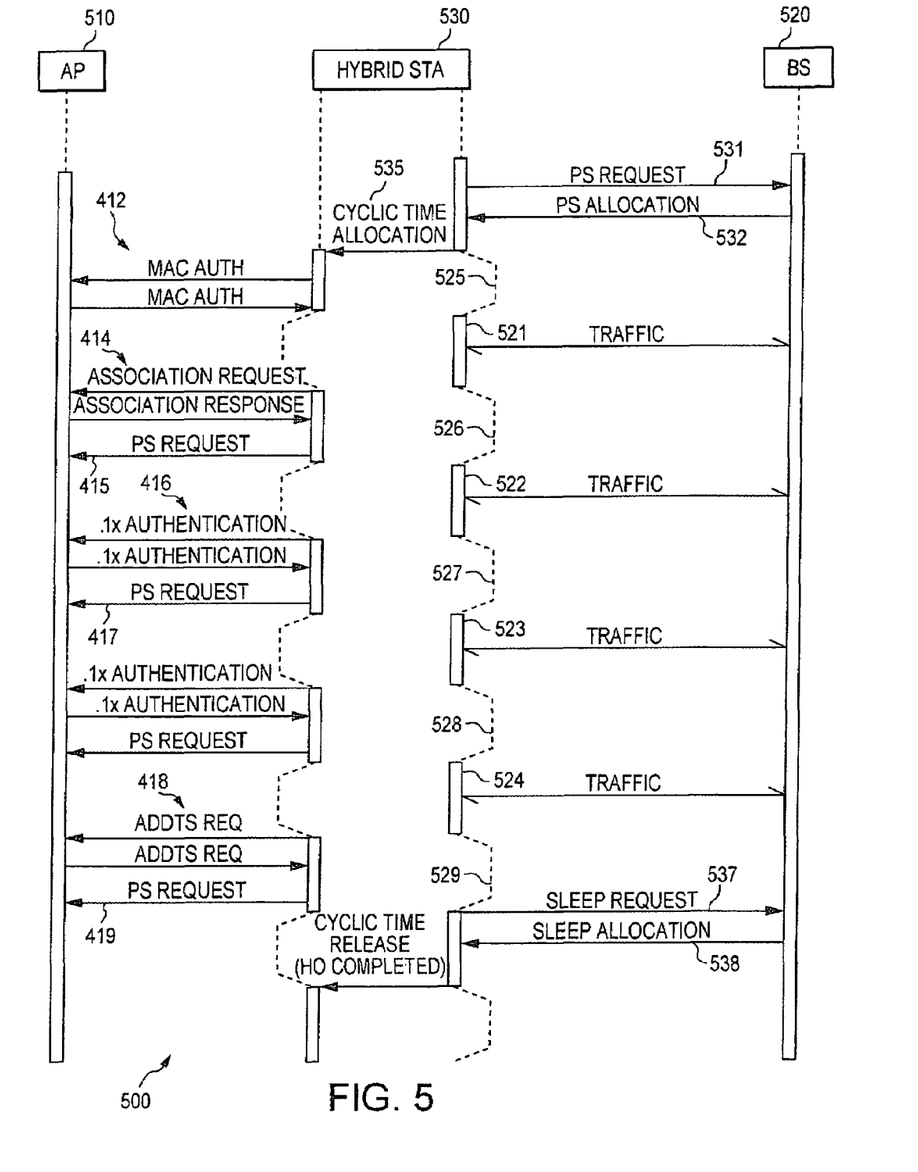
FIG. 5 is another example of a more detailed schematic timing diagram of wireless communication signals during network handover in accordance with another embodiment of the invention.

Reference is now made to FIG. 5, which schematically illustrates another example of a timing diagram 500 of wireless communication signals during network handover in accordance with one demonstrative embodiment of the invention. Although embodiments of the invention are not limited in this respect, timing diagram 500 may represent a fragmented layer 2 handover procedure from a first subsystem of a hybrid station, e.g., operating in accordance with IEEE 802.16 to a second subsystem of the hybrid station, e.g., operating in accordance with IEEE 802.11. It will be appreciated that the fragmented handover procedure may allow a "make-before-break" implementation where connectivity with a primary active network may be maintained during association with a heterogeneous secondary network.

Although embodiments of the invention are not limited in this respect, the hybrid station may send an indication or request 531 to enter a reduced power mode, e.g., power save (PS), and receive a PS response 532. It will be appreciated that, in accordance with a scheduled medium access scheme or communication protocol, such as, e.g., IEEE 802.16, the hybrid station may accordingly determine a cyclic time allocation 535 of alternating periods of activity and inactivity in the primary network by, for example, indicating or requesting sleep mode and/or periodic scan mode from the base station, or by requesting entrance to idle mode. During the periods of activity in the primary network, e.g., periods 521-524, the appropriate subsystem, e.g., transceiver 135 in accordance with IEEE 802.16, may communicate traffic including, for example, application data. During the periods of inactivity at the primary network, e.g., periods 525-529, the appropriate subsystem may perform a fragmented sequence of one or more atomic operations in the secondary network. Although embodiments of the invention are not limited in this respect, atomic operations may include one or more transaction sequences or protocol messages in accordance with the medium access scheme of the secondary network, e.g., IEEE 802.11. For example, one or more atomic operations or groups of atomic operations may include a MAC authentication transaction sequence 412, an association request/response sequence 414, a 0.1× authentication transaction sequence 416, a ADDTS request/response sequence 418, and the like, as known in the art. In addition, following each atomic operation or group of atomic operations of the sequence, the hybrid station may request an absence from the secondary network, e.g., by transmitting PS indications 415, 414, and 419, in order to re-activate the primary network for the subsequent predefined activity period in the allocated cycle. Once handover is completed and layer 2 connectivity of the wireless connection with is established in the secondary network, the hybrid station may disassociate from the primary network or, for example, request a longer reduced power mode, e.g., sleep request 537. Although embodiments of the invention are not limited in this respect, the station may receive a sleep allocation 538 in the primary network, which may end the cyclic time allocation 535. Following the fragmented handover procedure, normal operations may continue normal operations in the secondary, now-active, network.

Some embodiments of the invention may be implemented by software, by hardware, or by any combination of software and/or hardware as may be suitable for specific applications or in accordance with specific design requirements. Embodiments of the invention may include units and/or sub-units, which may be separate of each other or combined together, in whole or in part, and may be implemented using specific, multi-purpose or general processors or controllers, or devices as are known in the art. Some embodiments of the invention may include buffers, registers, stacks, storage units and/or memory units, for temporary or long-term storage of data or in order to facilitate the operation of a specific embodiment.

Some embodiments of the invention may be implemented, for example, using a machine-readable medium or article which may store an instruction or a set of instructions that, if executed by a machine, for example, by station 130 of FIG. 1, by processor 141 of FIG. 1, or by other suitable machines, cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software, including, for example, dedicated or configurable hardware state machines. The machine-readable medium or article may include, for example, any suitable type of memory unit (e.g., memory unit 144 or storage unit 145), memory device, memory article, memory medium, storage device, storage article, storage medium and/or storage unit, for example, memory, removable or non-removable media, erasable or non-erasable media, writeable or re-writeable media, digital or analog media, hard disk, floppy disk, compact disk read only memory (CD-ROM), compact disk recordable (CD-R), compact disk re-writeable (CD-RW), optical disk, magnetic media, various types of digital versatile disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method comprising:
  handing over a wireless connection of a wireless station from a first wireless communication device on a first wireless communication network operating according to a first wireless protocol to a second wireless communication device on a second wireless communication network operating according to a second wireless protocol by performing at the wireless station a fragmented sequence of one or more atomic operations, between the wireless station and the second wireless communication device, of a procedure defined in the second network during a respective sequence of one or more, spaced-apart, time periods when the wireless station is not communicating with the first wireless communication device on the first network, and activating the connection between the wireless station and the first wireless communication device on said first wireless network between two consecutive atomic operations of said sequence in the second wireless network.

2. The method of claim 1, wherein said sequence of one or more atomic operations comprises a sequence of protocol messages in accordance with the wireless protocol of the second network.

3. The method of claim 1, wherein said time periods are determined using one or more orderly absence mechanism in accordance with the wireless protocol of said first network.

4. The method of claim 1, wherein said procedure defined in the second network comprises a network entry procedure.

5. The method of claim 1, wherein said procedure defined in the second network comprises a network disassociation procedure.

6. A wireless communication device comprising:
  a processor able to hand over a wireless connection of the wireless communication device from a first device on a first wireless communication network, operating according to a first wireless protocol, to a second device on a second wireless communication network, operating according to a second wireless protocol, by performing at the wireless communication device a fragmented sequence of one or more atomic operations, between the wireless communication device and the second device, of a procedure defined in the second network during a respective sequence of one or more, spaced-apart, time periods when the wireless communication device is not communicating with the first device on the first network, wherein said processor is able to activate the connection between the wireless communication device and the first device on the first wireless network between two consecutive atomic operations of said sequence in the second wireless network.

7. The device of claim 6, comprising:
a first communication subsystem having a first transceiver able to connect with the first wireless network in accordance with a first medium access scheme;
and a second communication subsystem having a second transceiver able to connect with the second wireless network in accordance with a second medium access scheme.

8. The device of claim 7, wherein said first and second communication subsystems share a hybrid transceiver able to alternately connect to said first wireless network and said second wireless network.

9. The device of claim 7, wherein at least one of said first and second medium access schemes comprises a communication protocol relating to the IEEE 802.11 standard.

10. The device of claim 7, wherein at least one of said first and second medium access schemes comprises a communication protocol relating to the IEEE 802.16 standard.

11. A wireless communication system comprising:
a first wireless communication network operating according to a first wireless protocol;
a second wireless communication network operating according to a second wireless protocol; and
at least one wireless communication device having:
a processor able to hand over a wireless connection of the wireless communication device from a first device on the first wireless network to a second device on the second wireless network by performing at the wireless communication device a fragmented sequence of one or more atomic operations, between the wireless communication device and the second device, of a procedure defined in the second network during a respective sequence of one or more, spaced-apart, time periods when the wireless communication device is not communicating with the first device on the first network, wherein said processor is able to activate the connection between the wireless communication device and the first device on the first network between two consecutive atomic operations of said sequence in the second network.

12. The system of claim 11, wherein said wireless communication device includes a first communication subsystem having a first transceiver able to connect with the first wireless network in accordance with a first medium access scheme, and a second communication subsystem having a second transceiver able to connect with the second wireless network in accordance with a second medium access scheme.

13. The system of claim 12, wherein said first and second communication subsystems share a hybrid transceiver able to alternately connect to said first wireless network and said second wireless network.

14. The system of claim 11, wherein at least one of said first and second medium access schemes comprises a communication protocol relating to the IEEE 802.11 standard.

15. The system of claim 11, wherein at least one of said first and second medium access schemes comprises a communication protocol relating to the IEEE 802.16 standard.

16. The system of claim 11, comprising:
at least one additional wireless communication device able to communicate over said first network with the wireless communication device handing over said wireless connection.

17. The system of claim 11, comprising:
at least one additional wireless communication device able to communicate over said second network with the wireless communication device handing over said wireless connection.

* * * * *

UNITED STATES PATENT AND TRADEMARK OFFICE
CERTIFICATE OF CORRECTION

| | | |
|---|---|---|
| PATENT NO. | : 7,697,481 B2 | Page 1 of 1 |
| APPLICATION NO. | : 11/394180 | |
| DATED | : April 13, 2010 | |
| INVENTOR(S) | : Giora Rayzman et al. | |

It is certified that error appears in the above-identified patent and that said Letters Patent is hereby corrected as shown below:

Title page, Item 54, "Title", delete "HEREOGENOUS" and insert -- HETEROGENEOUS --, therefor.

In column 1, line 2, delete "HEREOGENOUS" and insert -- HETEROGENEOUS --, therefor.

Signed and Sealed this

Twenty-ninth Day of June, 2010

David J. Kappos
*Director of the United States Patent and Trademark Office*